(12) United States Patent
Shima

(10) Patent No.: US 7,577,746 B2
(45) Date of Patent: Aug. 18, 2009

(54) NETWORK SYSTEM FOR ESTABLISHING PEER-TO-PEER COMMUNICATION

(75) Inventor: Koji Shima, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 860 days.

(21) Appl. No.: 10/733,460

(22) Filed: Dec. 10, 2003

(65) Prior Publication Data

US 2004/0148406 A1  Jul. 29, 2004

(30) Foreign Application Priority Data

Dec. 10, 2002   (JP) ............................. 2002-358760

(51) Int. Cl.
*G06F 15/16* (2006.01)
(52) U.S. Cl. .................... 709/229; 709/228; 709/227
(58) Field of Classification Search .................. 709/204, 709/238, 21, 207, 203, 228, 229; 370/259, 370/409
See application file for complete search history.

(56) References Cited

U.S. PATENT DOCUMENTS

| | | | |
|---|---|---|---|
| 6,144,671 A * | 11/2000 | Perinpanathan et al. | 370/409 |
| 6,463,471 B1 * | 10/2002 | Dreke et al. | 709/224 |
| 6,538,990 B1 * | 3/2003 | Prorock | 370/229 |
| 6,931,433 B1 * | 8/2005 | Ralston et al. | 709/206 |
| 7,099,288 B1 * | 8/2006 | Parker et al. | 370/259 |
| 7,298,733 B2 * | 11/2007 | Sakai et al. | 370/352 |
| 2002/0035594 A1 * | 3/2002 | Dreke et al. | 709/203 |
| 2003/0105812 A1 * | 6/2003 | Flowers et al. | 709/203 |
| 2003/0212804 A1 * | 11/2003 | Hashemi | 709/228 |

* cited by examiner

*Primary Examiner*—Jeffrey Pwu
*Assistant Examiner*—Sulaiman Nooristany
(74) *Attorney, Agent, or Firm*—Frommer Lawrence & Haug LLP; William S. Frommer; Thomas F. Presson

(57) ABSTRACT

In a peer-to-peer network system, a first network terminal sends a request message to a host terminal. The host terminal receives this request message and extracts from this message an IP address of the first network terminal. A second network terminal also sends a request message to the host terminal, and the host terminal receives this request message, too. The host terminal sends a reply message to the second network terminal, where the host terminal has the IP address of the first network terminal contained in this reply message. The second network terminal extracts from the reply message the IP address of the first network and, based on this extracted IP address, starts a peer-to-peer communication with the first network terminal.

16 Claims, 10 Drawing Sheets

FIG. 5

- 111 — Date: 22 Nov 2002 16:03:06 +0900
- 112 — From: abc@client.ne.jp
- 114 — To: game-host@network-game.co.jp
- 116 — Subject: data for network game client
- 118 — This messsage is for a game. Please delete this message.
- 120 — IP address: 123.234.123.234
- 122 — User ID : abc

```
111 ── Date: 22 Nov 2002 16:03:06 +0900
112 ── From: abc@client.ne.jp
114 ── To: game-host@network-game.co.jp
116 ── Subject: data for network game client
118 ── This message is for a game. Please delete this message.
124 ── fzC9+l+igTHoFi5bd+YpALi6uxGZwjEJoKP6ZCxsEk8Tqchl==
```

110

NETWORK SYSTEM FOR ESTABLISHING PEER-TO-PEER COMMUNICATION

BACKGROUND OF THE INVENTION

1. Field of the Invention

The present invention relates to a network establishing method and network terminals, and it particularly relates to a technology by which to support and assist the network connection utilizing the peer-to-peer communication.

2. Description of the Related Art

In recent years, attention has been directed to the so-called peer-to-peer communication in which terminals connect directly with each other to form a network without the medium of servers and exchange data among themselves. The peer-to-peer communication also offers a wide range of applications, including chat communication, file sharing and game data exchange. This mode of communication does not require the intermediation of servers to exchange data and has thus gained its popularity by helping the users form their own communities at the grassroots level.

To establish a network connection with a certain peer terminal in a peer-to-peer communication, it is necessary for a user to acquire the IP address of the peer in advance. In the era of IPv6 to come, IP addresses would be assigned fixedly to all the terminals, but that is not the case at present. Under the existing circumstances, the IP address of each terminal is no more than an address assigned temporarily, and a different IP address is assigned by a provider each time an Internet connection is initiated. Hence, whenever a new IP address is assigned to a terminal, the terminal must pass on the new IP address to the other peer terminals to start a network connection in a peer-to-peer communication.

Furthermore, it is troublesome to find the IP address assigned to the user's own terminal with the help of a certain program and conveying the IP address to his/her peers by phone or other means each time he/she wants to have a peer-to-peer communication. It may be possible to install a dedicated server for exchanging IP addresses between peer terminals and to have each user access the server, but in such a case the installation and maintenance of the server may entail a huge expenditure. Besides, as the number of accesses increases, the need to build up the equipment capacity will require further investment.

SUMMARY OF THE INVENTION

The present invention has been made in view of the foregoing circumstances and recognition, and an object thereof is to provide a simple network system for establishing network connections in peer-to-peer communication. The present invention has also been made with objects, such as a novel proposition in network technology, a low-cost structuring of a network system in peer-to-peer communication and an improvement of security of personal information in peer-to-peer communication, and other objects which are to be understood from the description of the present patent specifications.

A preferred embodiment according to the present invention relates to a network system. This network system includes: a client terminal which requests a peer-to-peer communication; and a host terminal which supports establishing a connection of the peer-to-peer communication. The client terminal generates a request message that contains an IP address of the own client terminal, and the client terminal sends out the request message to the host terminal via a transmission mail server, wherein the host terminal acquires the request message via a reception mail server, the host terminal extracts the IP address of the client terminal from a description content of the request message, the host terminal stores the extracted IP address in a table, the host terminal selects at least one IP address from the table and generates a reply message containing the thus selected at least one IP address, and the host terminal sends out the reply message to the client terminal via the transmission mail server, and wherein the client terminal acquires the reply message via the reception mail server, the client terminal extracts at least one IP address of other terminals from a description content of the rely message, and the client terminal starts a peer-to-peer communication of data transmission and reception with another terminal which is specified based on the thus extracted IP address.

The "peer-to-peer communication" is a communication mode where terminals connect directly with each other to form a network without the medium of a dedicated server therethrough. The method to establish the network connection may be a connection-less method, such as UDP (User Datagram Protocol), which does not require securing and opening of communication paths before and after the communication or may be a connection-oriented method, such as TCP (Transmission Control Protocol), which requires the securing and opening of communication paths before and after the communication. The "starting the data transmission and reception" includes a process of negotiation to establish a connection, in the case of using the TCP.

The "request message" may be electronic mail (Email) transmitted using a mail transmission protocol. The request message is transferred to a reception mail server that a host terminal uses, via a relaying means of a transmission mail server that a client terminal uses. The "host terminal" may be a terminal that supports the exchange of IP addresses between the client terminals when the connection is established in a peer-to-peer communication. The "host terminal destination" may be an electronic mail address utilized by the host terminal, and a message addressed to the host terminal is actually sent to a reception mail server which is specified by said electronic mail address. Moreover, the host terminal may be replaced by another terminal as long as the message addressed to said electronic mail address is receivable thereby, so that an arbitrary terminal may be utilized as a host terminal. By implementing the above system, the IP address of each terminal can be exchanged between terminals requesting the peer-to-peer communication.

Another preferred embodiment according to the present invention relates to a method of establishing a network connection. This method includes: generating a request message that contains an IP address of a client terminal requesting a peer-to-peer communication; sending out the request message, via a transmission mail server, to a host terminal that supports establishing a connection of the peer-to-peer communication; acquiring by the host terminal the request message via a reception mail server; extracting by the host terminal the IP address of the client terminal from a description content of the request message; storing by the host terminal the IP address extracted by the extracting, in a table; selecting by the host terminal at least one IP address from the table and generating a reply message that contains the at least one IP address thus selected; sending out by the host terminal the reply message to the client terminal, via the transmission server; acquiring by the client terminal the reply message, via the reception mail server; extracting by the client terminal at least one IP address of other terminals from a description content of the reply message; and starting a peer-to-peer communication of data transmission and reception with other terminals, based on the IP address extracted by the client terminal in the extracting. By performing the above method, the IP address of each terminal can be exchanged between terminals carrying out the peer-to-peer communication.

Still another preferred embodiment according to the present invention relates to a network terminal. This terminal includes: a data generator which generates a request message that contains an IP address of own terminal; a mail transmission and reception unit which sends out the request message to a terminal serving as a host, via a transmission mail server, and which acquires a reply message serving as a response sent from the terminal serving as a host, via a reception mail server; a selection processing unit which extracts at least one IP address of other terminals from a description content of the reply message; and a data exchanging unit which starts a peer-to-peer communication of data transmission and reception with another terminal which is specified based on the IP address extracted by the selection processing unit.

The network terminal mentioned here corresponds to a client terminal that requests a peer-to-peer communication. By implementing the above structure, the IP address of each terminal can be exchanged between the terminals carrying out the peer-to-peer communication.

Still another preferred embodiment according to the present invention relates also to a network terminal. This terminal includes: a mail transmission and reception unit which acquires, via a reception mail server, a request message containing an IP address of a terminal that requests a peer-to-peer communication; an extraction processing unit which extracts the IP address from a description content of the request message; an address storage unit which stores the extracted IP address in a table; and a data generator which selects at least one IP address from a storage content of the table and generates a reply message that contains the thus selected IP address. The mail transmission and reception unit sends out the reply message to the requesting terminal, via a transmission mail server.

The network terminal mentioned here corresponds to a host terminal that supports establishing a connection of a peer-to-peer communication. By implementing the above structure, the IP address of each terminal can be exchanged between the terminals carrying out the peer-to-peer communication.

Still another preferred embodiment according to the present invention relates to a method of establishing a network connection. This method includes: generating a request message containing an IP address of a terminal that requests a peer-to-peer communication; sending out the request message to a terminal serving as a host, via a transmission mail server; acquiring a reply message serving as a response sent from the terminal serving as a host, via a reception mail server; extracting at least one IP address of other terminals from a description content of the reply message; and starting a peer-to-peer communication of data transmission and reception with another terminal which is specified based on the IP address extracted by the extracting.

Still another preferred embodiment according to the present invention relates also to a method of establishing a network connection. The method includes: acquiring, via a reception mail server, a request message containing an IP address of a terminal that requests a peer-to-peer communication; extracting the IP address from a description content of the request message; storing the extracted IP address in a table; selecting at least one IP address from a storage content of the table and generating a reply message that contains the thus selected IP address; and sending out the reply message to the requesting terminal, via a transmission mail server.

It is to be noted that any arbitrary combination of the above-described structural components and expressions changed between a method, an apparatus, a system, a computer program, a recording medium having stored computer programs therein, a data structure and so forth are all effective as and encompassed by the present embodiments.

Moreover, this summary of the invention does not necessarily describe all necessary features so that the invention may also be sub-combination of these described features.

BRIEF DESCRIPTION OF THE DRAWINGS

FIG. 5 shows the contents of a request message to be generated by a data generator at a network terminal.

FIG. 6 shows an example of encryption of part of the request message shown in FIG. 5.

DETAILED DESCRIPTION OF THE INVENTION

The invention will now be described based on the following embodiments which do not intend to limit the scope of the present invention but exemplify the invention. All of the features and the combinations thereof described in the embodiments are not necessarily essential to the invention.

FIRST EMBODIMENT

In a first embodiment of the present invention, a means is provided to support the exchange of IP addresses between a plurality of network terminals when establishing a network connection in a peer-to-peer communication. And the medium to be utilized for the exchange of IP addresses is electronic mail (hereinafter also referred to as Email). Since existing mail servers are used, special servers need not be newly provided, and an environment or a system may be structured for exchanging IP addresses with minimal necessity for equipment investment. A system of peer-to-peer communication as a new "server-less" model will be proposed hereinbelow.

Figure 1:
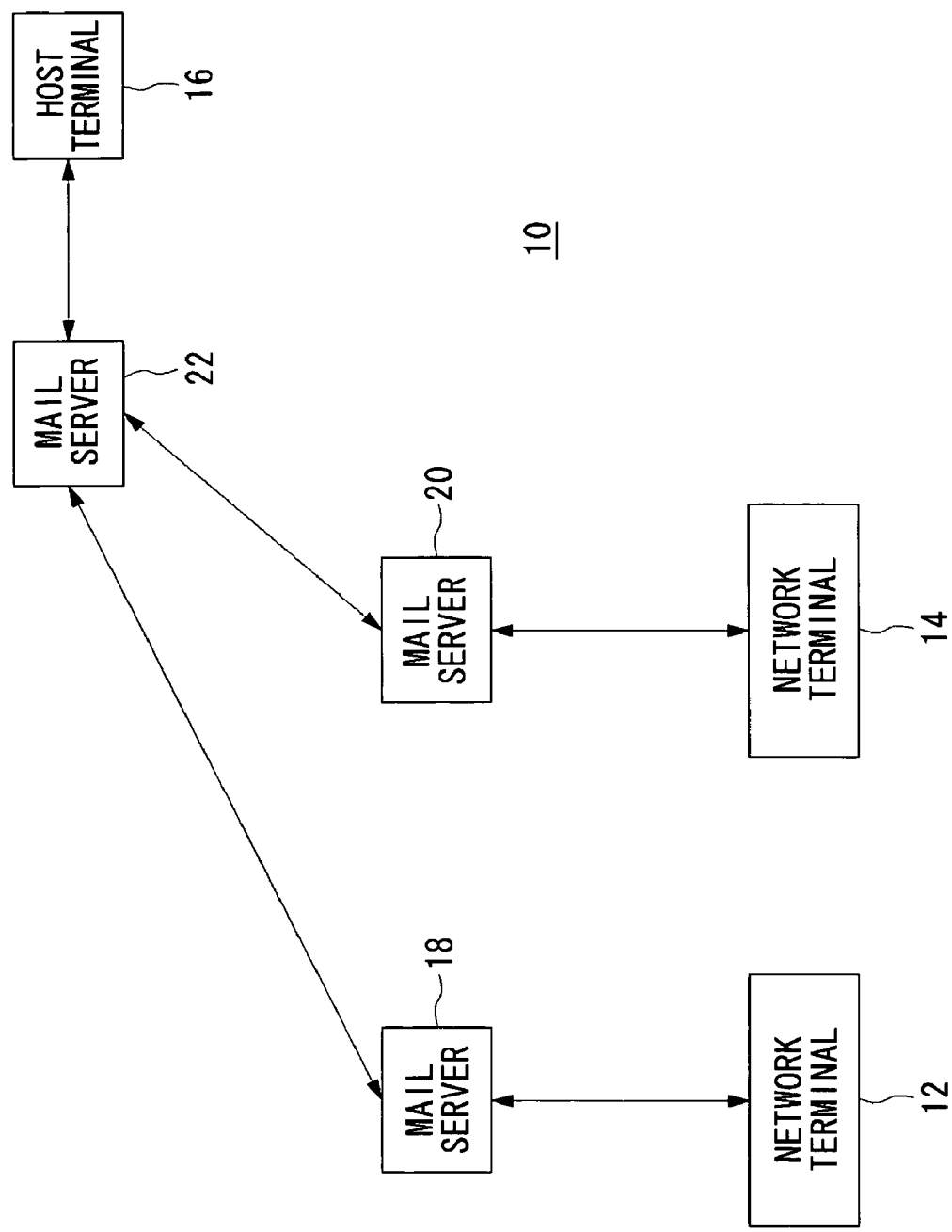
FIG. 1 shows a structure of a peer-to-peer network system according to a first embodiment of the present invention.

FIG. 1 shows a structure of a peer-to-peer network system according to a first embodiment of the present invention. In a peer-to-peer network system 10, a first network terminal 12, a second network terminal 14, a host terminal 16, a first mail server 18, a second mail server 20, and a third mail server 22 are each connected to an IP (Internet Protocol) network, such as the Internet. The first mail server 18, the second mail server 20 and the third mail server 22 are each an ordinary mail server that includes a transmission mail server and reception mail server integrally structured together. These mail servers may also be so configured that the transmission mail server and the reception mail server are separate pieces of hardware.

The transmission mail server is an SMTP (Simple Mail Transfer Protocol) server, whereas the reception mail server is a POP (Post Office Protocol) server or an IMAP (Internet Message Access Protocol) server.

The first mail server 18 is a mail server utilized by the first network terminal 12. An electronic mail sent from the first network terminal 12 is relayed by the first mail server 18 and delivered to a mail server of an addressee (also simply referred to as a destination mail server). An electronic mail sent to the first network terminal 12, on the other hand, is stored in the mailbox of the first mail server 18. In a similar manner, the network terminal 14 utilizes the second mail server 20, and the host terminal 16 utilizes a third mail server 22.

In terms of hardware, the first network terminal 12, the second network terminal 14 and the host terminal 16 can be realized by a CPU of a personal computer or other similar elements. In terms of software, it is realized by programs having electronic mail transmission/reception function, IP network communication function or the like, but drawn in FIG. 2 or FIG. 3 and described here are function blocks that are realized in cooperation with those. Thus, it is understood by those skilled in the art that these function blocks can be realized in a variety of forms by hardware only, software only or the combination thereof.

If the present system is a system for a network game to be played in a peer-to-peer communication, the network terminals are player terminals and the host terminal may be a terminal provided by one of the players or a terminal provided by a game company.

It is to be understood that the first mail server 18, the second mail server 20 and the third mail server 22 may generally be mail servers offered by an Internet service provider (ISP) or may often be mail servers installed within an enterprise. Which mail server each of the users uses is simply a question of which user contract he/she is in, and it goes without saying that each user may use the same mail server. In FIG. 1, the first network terminal 12 and the second network terminal 14 are shown as examples of terminals requesting a peer-to-peer communication, but three or more network terminals may be included in this peer-to-peer network system 10.

Figure 2:
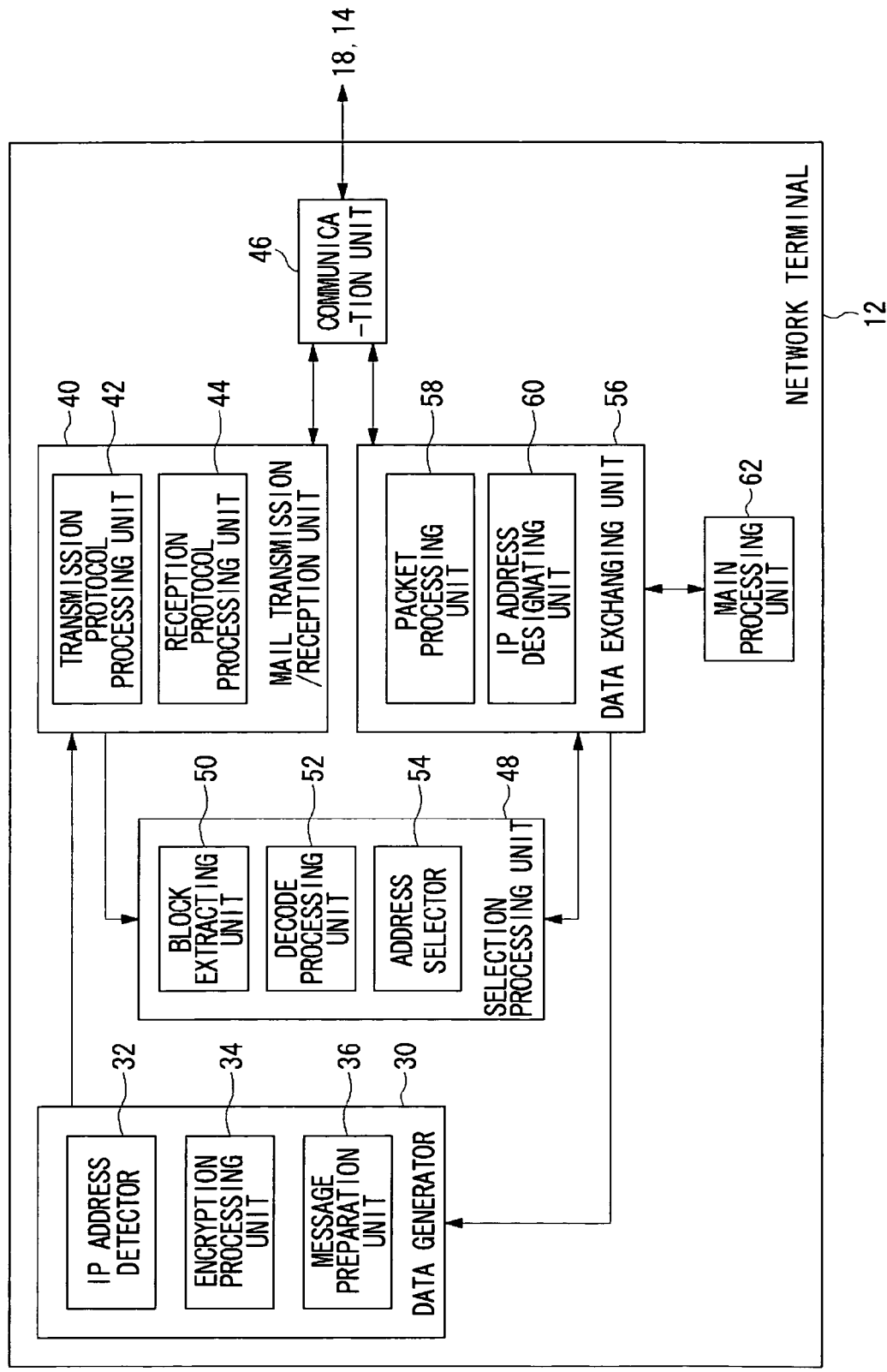
FIG. 2 is a functional block diagram showing a structure of a network terminal.

FIG. 2 is a functional block diagram showing a structure of a first network terminal 12. Since the first network terminal 12 and the second network terminal 14 in FIG. 1 have the same structure and functions, FIG. 2 is described using the first network terminal 12 as an example. The first network terminal 12 includes a data generator 30, a mail transmission/reception unit 40, a communication unit 46, a selection processing unit 48, a data exchanging unit 56 and a main processing unit 62. The mail transmission/reception unit 40 and the data exchanging unit 56 transmit data to and/or receive data from external units, such as the first mail server 18 or the second network terminal 14, via the communication unit 46.

The data generator 30 includes an IP address detector 32, an encryption processing unit 34 and a message preparation unit 36. The IP address detector 32 detects an IP address assigned to its own terminal, which is the first network terminal 12. The IP address meant here is a global IP address. Where a private IP address is assigned by the DHCP (Dynamic Host Configuration Protocol) function of a router, the global IP address assigned to the router is detected. In this case, it is assumed that the problem of address conversion in a peer-to-peer communication is solved by a function such as NAT (Network Address Translation) or Static IP Masquerade (Port Forward).

The encryption processing unit 34 generates a coded block by encrypting an IP address detected by the IP address detector 32 and identification information to identify the user of the first network terminal 12. This identification information is a user ID predetermined for each user, so that peer terminals can see this user ID and decides whether to permit or reject connection with it. For a network connection in a peer-to-peer communication among acquaintances only, this identification information is used for authenticating the other peers. As a method for encryption, a secret algorithm may be used to prevent the leakage of personal information. The message preparation unit 36 generates an electronic mail including a coded block as a request message to the electronic mail address of the host terminal 16 which has been stored in advance.

The mail transmission/reception unit 40 includes a transmission protocol processing unit 42 and a reception protocol processing unit 44. The transmission protocol processing unit 42 has an electronic mail transmission function using a mail transmission protocol such as SMTP. The transmission protocol processing unit 42 sends an electronic mail as a request message to the host terminal 16 via the first mail server 18. The transmission protocol processing unit 42 stores information necessary for transmission, such as an SMTP server name, in advance.

The reception protocol processing unit 44 has an electronic mail reception function using a mail reception protocol such as POP or IMAP. The reception protocol processing unit 44 receives from the first mail server 18 a reply message sent from the host terminal 16 as a response to the request message. The reception protocol processing unit 44 stores information necessary for reception, such as a POP or IMAP server name, a reception password and the Email address of its own terminal, in advance.

The reception protocol processing unit 44 may check periodically to see whether the first mail server 18 has received the reply message. For example, a periodic check on electronic mail reception may be started at every transmission of a request message. The reception protocol processing unit 44 receives reply messages only from the first mail server 18, making a distinction of them from the other electronic mail. For example, the reception protocol processing unit 44 uses a specific character string as a search key and receives a message as a request message from the first mail server 18 only when it decides that the message has the search key contained in a predetermined item in a predetermined format. For example, items within electronic mail, such as subject and body of texts, entry format, such as partial match or exact match, and a character string as a search key are determined in advance. The reception protocol processing unit 44 also deletes a received reply message from the first mail server 18 after the reception thereof.

The selection processing unit 48 includes a block extracting unit 50, a decode processing unit 52 and an address selector 54. The block extracting unit 50 extracts a coded block from the contents of description of a reply message received by the reception protocol processing unit 44. A coded block contains a plurality of IP addresses and identification information corresponding thereto in an encrypted state. The decode processing unit 52 acquires the IP addresses and the identification information by decoding the coded block. In the case where there have been no IP addresses of the other terminals stored in the host terminal 16, the reply message does not contain a coded block and therefore the decode processing unit 52 cannot acquire the IP addresses of the other terminals. In such a case, a request for connection from the other terminals will be awaited because at least the IP address of its own terminal is stored in the host terminal 16 and the other terminals are notified of it.

When a plurality of IP addresses are acquired from a coded block, the address selector 54 selects at least one of them as a trial partner in network connection. For example, when a plurality of IP addresses are arranged in order of time for storage in the host terminal 16, the address selector 54 selects an IP address stored most recently on a preferential basis. Where it is indicated that any one of the plurality of IP addresses is difficult to connect, the address selector 54 selects an IP address after lowering the priority of the IP address difficult to connect.

The address selector 54 may select a connection partner based on the identification information on each of the IP addresses acquired from the coded block. For example, user IDs of acquaintances may be registered beforehand as connection partners, and the IP addresses corresponding to the user IDs may be selected preferentially. Conversely, user IDs of users with whom connection will be rejected may be registered beforehand, and the IP addresses corresponding thereto may be excluded from selection.

The data exchanging unit 56 includes a packet processing unit 58 and an IP address designating unit 60. The packet processing unit 58 generates a packet required to start a data transmission/reception in a peer-to-peer communication. The IP address designating unit 60 designates an IP address selected by the selection processing unit 48 as a destination, and this IP address is embedded together with the IP address of the user's own terminal in the packet by the packet processing unit 58. Here it is assumed that the terminal identified by the selected IP address is the second network terminal 14. In this manner, the packet processing unit 58 generates a request packet for network connection and sends it directly to the second network terminal 14.

The packet processing unit 58 receives a connection request packet from the partner together with an ACK response from the second network terminal 14. To this, the packet processing unit 58 also returns an ACK response to conclude the negotiations with the second network terminal 14, thus establishing a network connection therewith. Now a communication channel is established between the first network terminal 12 and the second network terminal 14, and a peer-to-peer communication can be held thereafter.

On the other hand, when the packet processing unit 58 has failed to establish a network connection with another terminal and thus cannot start a data transmission/reception therewith, the packet processing unit 58 sends the IP address of the unsuccessful connection to the data generator 30 and at the same time acquires another IP address from the address selector 54. An example of an unsuccessful connection is a case where no ACK response is received from the second network terminal 14 when the packet processing unit 58 has sent a connection request thereto. In this case, the IP address designating unit 60 designates another IP address, and the packet processing unit 58 generates a new packet and sends it to another terminal.

The message preparation unit 36 of the data generator 30 generates a notice message containing the IP address of the destination terminal with which connection has been unsuccessful. This notice message is transmitted by the mail transmission/reception unit 40 to the Email address of the host terminal 16 as its destination. In this manner, the host terminal 16 is notified of the IP address to which connection seems impossible.

As described above, selection of an IP address and an attempt to connect thereto are repeated until a network connection is established. In the case where a network connection cannot be established after attempts to connect to all the IP addresses acquired by the selection processing unit 48, the arrival of a request for connection from other terminals is awaited. Note that a network connection cannot be established, for example, when the destination terminal is in a state of disconnection from the network or when data transmission/reception is blocked by a firewall of a router.

To terminate a peer-to-peer communication, the packet processing unit 58 generates a disconnection request packet, sends it to the second network terminal 14 and receives an ACK response from the second network terminal 14, or returns an ACK response after receiving a disconnection request packet from the second network terminal 14.

The main processing unit 62 executes a main program adapted to a peer-to-peer communication, namely, an application program such as chat communication, file sharing or network game.

Figure 3:
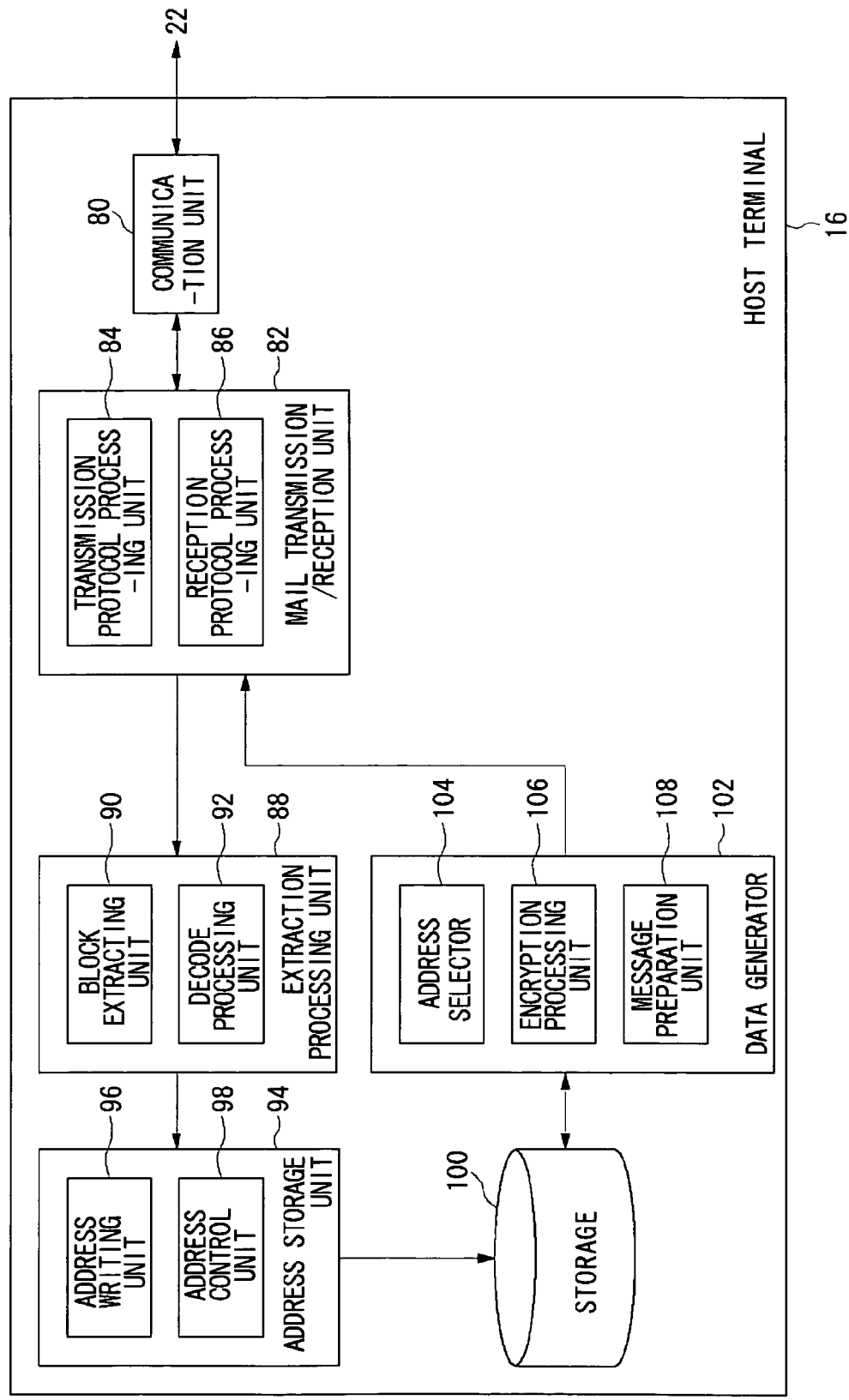
FIG. 3 is a functional block diagram showing a structure of a host terminal.

FIG. 3 is a functional block diagram showing a structure of a host terminal 16. The host terminal 16 assists and supports the exchange of respective IP addresses between the first network terminal 12 and the second network terminal 14 which request a peer-to-peer communication. The host terminal 16 includes a communication unit 80, a mail transmission/reception unit 82, an extraction processing unit 88, an address storage unit 94, a storage 100 and a data generator 102. The mail transmission/reception unit 82 transmits and receives electronic mail to and from an external unit, such as a third mail server 22, via the communication unit 80. The mail transmission/reception unit 82 includes a transmission protocol processing unit 84 and a reception protocol processing unit 86. This mail transmission/reception unit 82 may have the same structure and functions as the mail transmission/reception unit 40 shown in FIG. 2.

The mail transmission/reception unit 82 includes a transmission protocol processing unit 84 and a reception protocol processing unit 86. The reception protocol processing unit 86 acquires from the third mail server 22 a request message containing an IP address of the first network terminal 12 or the second network terminal 14 requesting a peer-to-peer communication. The reception protocol processing unit 86 checks periodically to see whether any request message has arrived at the third mail server 22. When it finds a request message there, the reception protocol processing unit 86 receives the request message and deletes it from the third mail server 22. The transmission protocol processing unit 84 sends out via the third mail server 22 a reply message as a response to the request message sent, from the first network terminal 12 or the second network terminal 14, to the first network terminal 12 or the second network terminal 14.

The extraction processing unit 88 includes a block extracting unit 90 and a decode processing unit 92. The block extracting unit 90 extracts a coded block, a sender's Email address and date and time information from the contents of description of a request message. The date and time information is a character string representing the date and time of transmission of the electronic mail, which is written in the header thereof. If, for example, the extracted date and time information is one more than a predetermined length of time, such as 12 hours, past, the block extracting unit 90 may delete the request message, deciding that it is old and thus no longer useful. This is because by now it is quite likely that the sender of the request message is disconnected from the network. The decode processing unit 92 decodes the coded block and acquires the IP address and identification information of the first network terminal 12 or the second network terminal 14.

The address storage unit 94 includes an address writing unit 96 and an address control unit 98. The address writing unit 96 stores in the control table within the storage 100 the IP address, identification information, Email address and date and time information extracted by the extraction processing unit 88 in an associated manner. The address control unit 98 controls the address writing unit 96 in such a way that the IP addresses stored earlier are overwritten by IP addresses to be stored newly. Accordingly, the number of IP addresses to be stored in the control table is limited to a predetermined number, and newer information only is held with older information removed. Moreover, the address control unit 98 deletes IP addresses after a certain period of storage. In doing so, the passage of the period is judged based on the date and time information stored in the control table. For example, if an IP address has been stored for half a day or longer, the IP address is deleted because it is judged that its terminal is already disconnected from the network. The control table of IP addresses is stored in the storage 100.

The data generator 102 includes an address selector 104, an encryption processing unit 106 and a message preparation unit 108. The address selector 104 selects at least one IP address and identification information corresponding thereto from the storage contents of the control table of the storage 100. At this time, the address selector 104 selects one or more IP addresses having been stored more recently from the storage contents of the control table. However, an IP address of a network terminal to which a reply message is to be sent is not to be selected even if the IP address thereof is stored as the latest information in the control table.

The encryption processing unit 106 generates a coded block by encrypting an IP address and identification information selected by the address selector 104. The message generator 108 generates a reply message containing the coded block. This reply message is sent by the transmission protocol processing unit 84 to the first network terminal 12 or the second network terminal 14.

In the case where no IP addresses are stored in the control table, the message generator 108 generates, only formally, a reply message containing no coded block. The encryption processing unit 106 handles the IP address and identification information only as the object of encryption and does not include the Email address as part of a reply message. This arrangement is employed to prevent Email addresses, which are a kind of information that can easily specify individuals, from leaking outside. Moreover, the encryption of IP addresses enhances the security of this system.

When the first network terminal 12 or the second network terminal 14 has sent out a notice message indicating an unsuccessful connection, the reception protocol processing unit 86 of the mail transmission/reception unit 82 receives the notice message from the third mail server 22. From the notice message, a coded block is extracted by the block extracting unit 90, and the coded block is decoded by the decode processing unit 92 to acquire the IP address and identification information.

When a received message, like a notice message indicating an unsuccessful connection, is different from a request message, the address control unit 98 collates the IP address acquired from the message with the control table. In the collation, however, the IP address is not directly searched in the control table, but the identification information acquired from the notice message is searched in the control table. That is, a certain line is identified based on the identification information contained in each line of the control table, and thereby the IP address contained in the line is identified. If the IP address is contained in the control table as a result of this collation, the address control unit 98 sets a flag for the IP address indicating an unsuccessful connection, thus distinguishing it from the other IP addresses. The value of this flag is included in the coded data that is generated by the encryption processing unit 106. Hence, the terminal which has received a reply message can refer to the value of the flag contained in the coded data to see whether there has been any connection failure with the IP address in the past or not.

Figure 4:
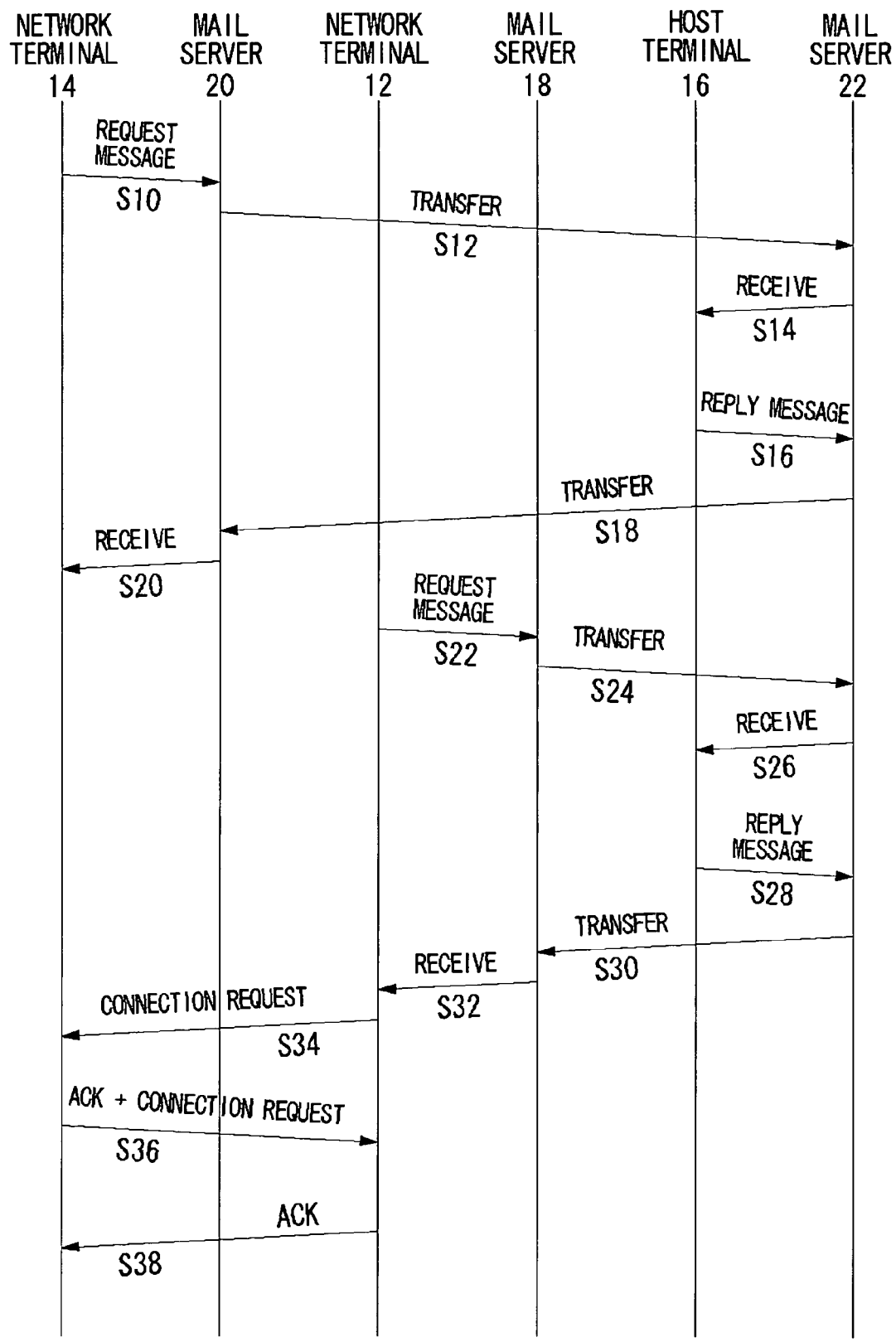
FIG. 4 shows a data flow of transmissions and receptions between network terminals, host terminal and mail servers.

FIG. 4 shows the data flow of transmissions and receptions between the network terminals, the host terminal and the mail servers. When the second network terminal 14 sends a request message to the second mail server 20 (S10), the second mail server 20 transfers the request message to the third mail server 22 (S12). The host terminal 16 receives the request message from the third mail server 22 (S14) and stores in the control table the IP address of the second network terminal 14 contained in the request message. Since no IP addresses are stored in the control table initially, the host terminal 16 sends an only formal reply message containing no IP address to the third mail server 22 (S16). The third mail server 22 transfers the reply message to the second mail server 20 (S18), and the second network terminal 14 receives the reply message from the second mail server 20 (S20). Since the IP addresses of the other terminals are not contained in the reply message received by the second network terminal 14, the second network terminal 14 is put on standby, awaiting the arrival of a request for connection from the other terminals.

The first network terminal 12 sends a request message containing the IP address of the user's own terminal to the first mail server 18 (S22), and the first mail server 18 transfers the request message to the third mail server 22 (S24). The host terminal 16 receives the request message from the third mail server 22 (S26) and stores in the control table the IP address of the first network terminal 12 contained in the request message. Thereafter, the host terminal 16 extracts the IP address of the second network terminal 14 from the control table and sends a reply message containing the extracted IP address to the third mail server 22 (S28). The third mail server 22 transfers the reply message to the first mail server 18 (S30), and the first network terminal 12 receives the reply message from the first mail server 18 (S32). The first network terminal 12 sends a connection request to the second network terminal 14 based on the IP address contained in the reply message (S34), and the second network terminal 14 returns the connection request together with an ACK response (S36). When the first network terminal 12 returns an ACK response to the second network terminal 14 (S38), a network connection of a peer-to-peer communication is established.

FIG. 5 shows the contents of a request message to be generated by a data generator 30 at each network terminal. The contents of a request message 110 shown in FIG. 5 represent the contents before encryption by the encryption processing unit 34. Date information 111 shows the date and time of transmission of the request message 110. A sender's mail address 112 is an Email address used by the first network terminal 12 or the second network terminal 14 and becomes the destination of a reply message later. A receiver's mail address 114, that is, a destination mail address, is an Email address used by a host terminal 16, and based on this address, a third mail server 22 is identified on the network as a mail box. A subject 116 in this case is a character string "data for network game client". The reception protocol processing unit 86 of the host terminal 16 receives selectively electronic mail which has this character string in the subject 116 only.

An explanatory text 118, that is, the body of texts, explains that this electronic mail is a request message 110. For the parties who have mistakenly received this request message 110 by an ordinary electronic mail client software, this message indicates that the contents of this electronic message are for use with a network game. An IP address 120 is the IP address of the first network terminal 12 or the second network terminal 14. A user ID 122 is identification information by which to identify the user of the first network terminal 12 or the second network terminal 14. In this example, the IP address 120 and the user ID 122 are placed in the body of the electronic mail, but they can be placed in the header thereof so long as their description method does not affect the routing of the electronic mail.

FIG. 6 shows an example of encryption of part of the request message shown in FIG. 5. A coded block 124 here is a character string generated by encrypting the IP address 120 and the user ID 122 of FIG. 5. The coded block 124 may be a character string encrypted using CRC (Cyclic Redundancy Check). By encrypting the IP address and the user ID like this, the secrecy of personal information can be maintained against those who may mistakenly receive and read this request message 110 by an ordinary electronic mail client software. It is to be noted that a reply message transmitted by the host terminal 16 is also generated in the same format as the one in FIG. 6.

Figure 7:
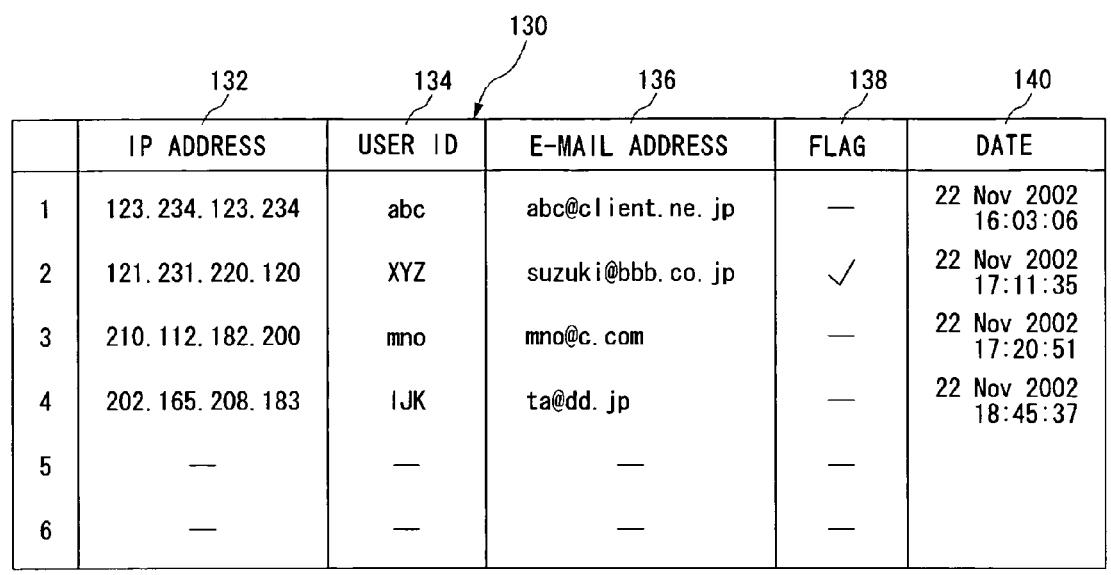
FIG. 7 shows the contents of storage in a control table of a storage.

FIG. 7 shows the contents of storage in the control table 130 of the storage 100. An IP address column 132 stores the IP addresses of the network terminals. A user ID column 134 stores identification information set for the users of the network terminals. An electronic mail (Email) address column 136 stores the Email addresses used by the network terminals. A flag column 138 stores the values of flags indicating successful or unsuccessful connections. A date column 140 stores date and time information indicating the time of transmission of request messages from the network terminals.

Figure 8:
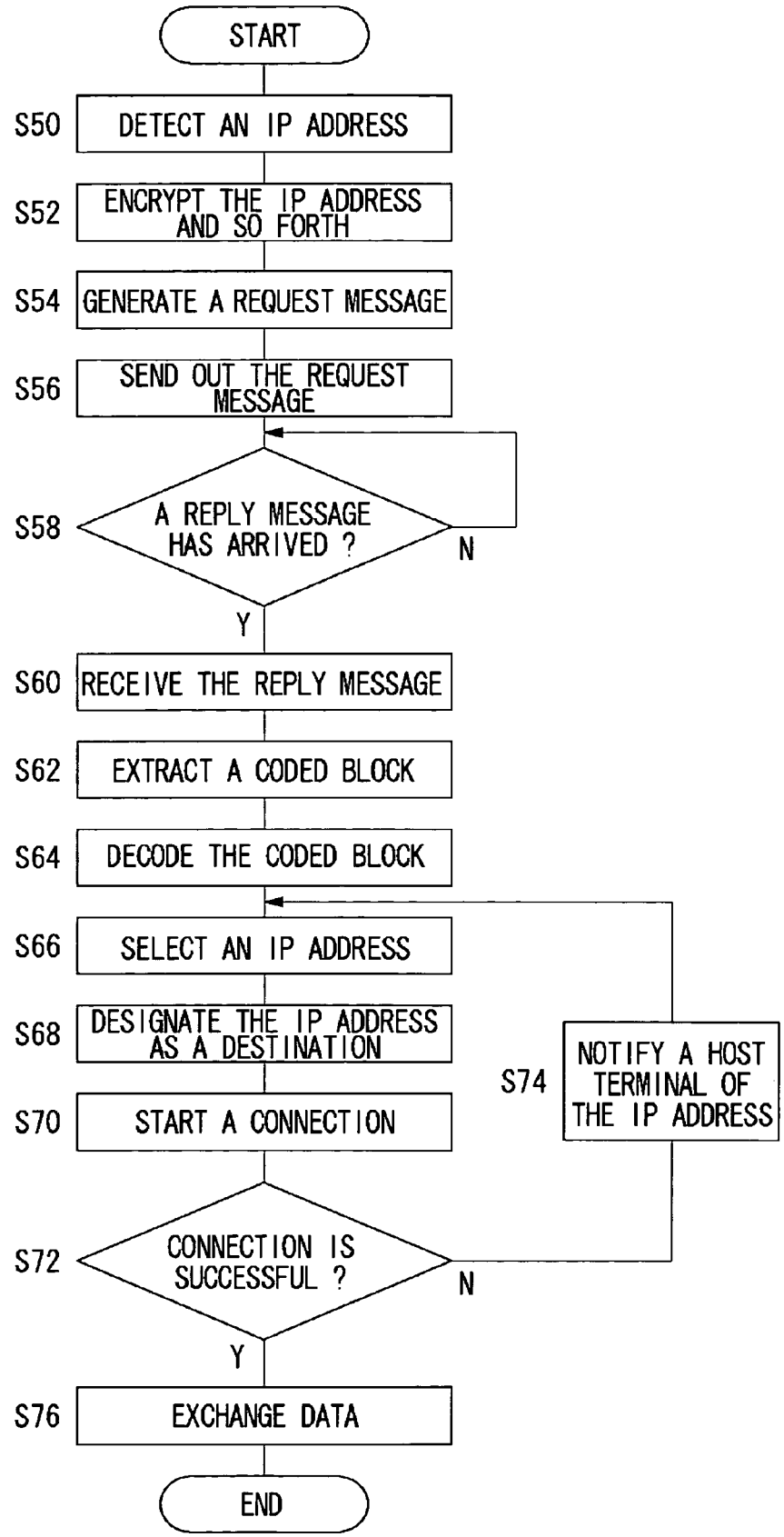
FIG. 8 is a flowchart showing a processing procedure at a network terminal.

FIG. 8 is a flowchart showing a processing procedure at the network terminals. The IP address of the user's own terminal is detected (S50), and the IP address and the user ID are encrypted (S52). A request message containing the encrypted IP address and user ID is generated (S54), and the request message is sent out to the host terminal 16 (S56).

After the transmission of the request message, periodic checks are made of the reception mail server until a reply message arrives from the host terminal 16 (S58N). When a reply message has arrived (S58Y), the reply message is received from the reception mail server (S60) and a coded block is extracted (S62). The coded block is decoded to acquire a plurality of IP addresses and user IDs (S64).

One pair of the plurality of IP addresses and user IDs is selected (S66), and a connection request packet designating it as the destination is generated (S68). The connection request packet is sent to another terminal and a connection is attempted (S70). When the attempt at connection is unsuccessful (S72N), a notice message containing the IP address of the unsuccessful connection is generated and sent out to the host terminal 16 (S74), and the processings of S66 to S70 are repeated until a connection is made successfully. When a connection is successful (S72Y), a peer-to-peer communication is carried out by exchanging data between the user's terminal and the peer terminal (S76).

Figure 9:
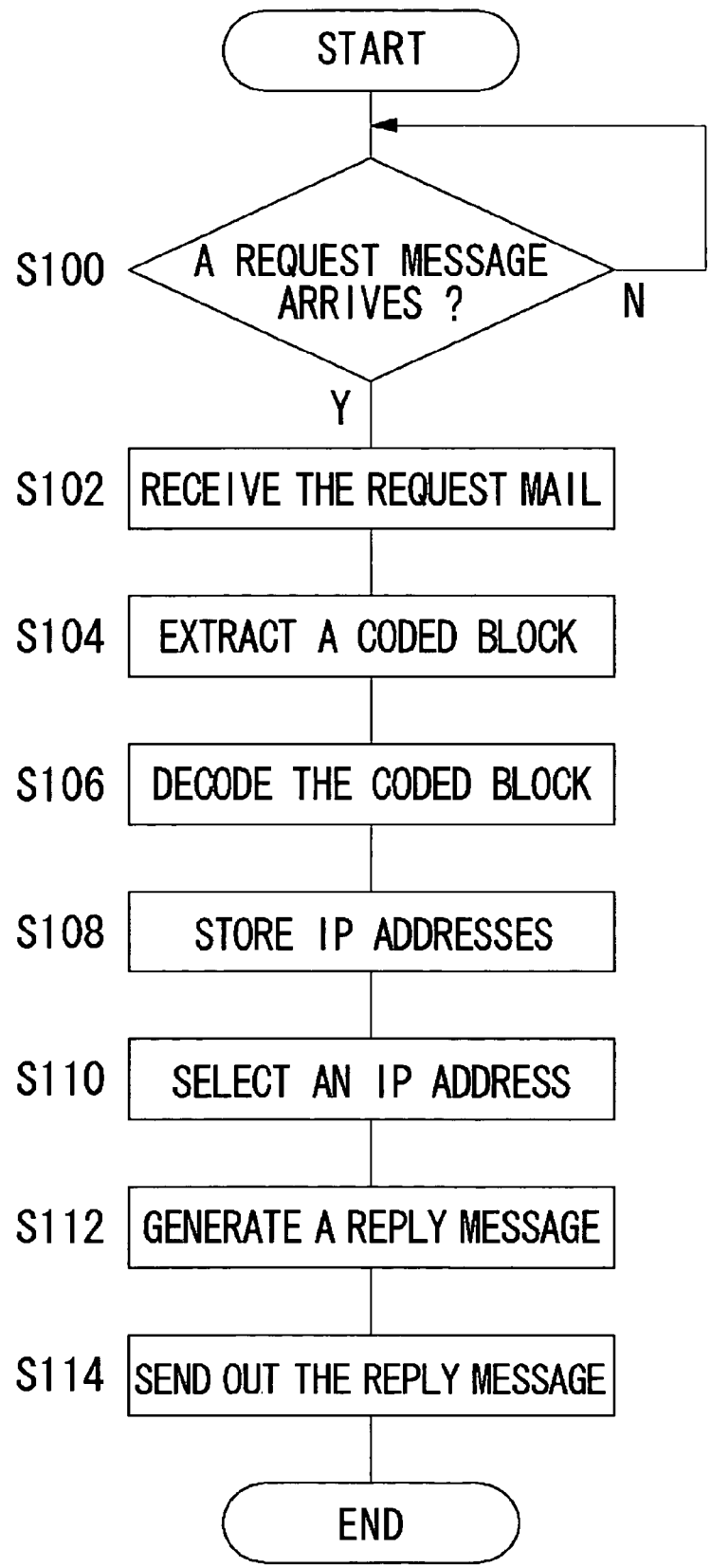
FIG. 9 is a flowchart showing a processing procedure at a host terminal.

FIG. 9 is a flowchart showing a processing procedure at a host terminal 16. The host terminal 16 checks reception periodically until a request message arrives at the reception mail server (S100N) and, when a request message has arrived at the reception mail server (S100Y), receives the request message from the third mail server 22 (S102). The host terminal 16 extracts from the request message a coded block (S104) to acquire an IP address and user ID (S106). The host terminal 16 stores information, such as the acquired IP address and user ID, in the control table (S108). The host terminal 16 selects from the contents of the control table an IP address of another terminal having already been stored (S110), generates a reply message containing an encrypted IP address thus selected (S112), and sends out the reply message to the network terminals (S114).

SECOND EMBODIMENT

A peer-to-peer network system according to a second embodiment of the present invention has a plurality of host terminals. Namely, this second embodiment differs from the first embodiment which has only one host terminal. Each of the network terminals sends a request message almost simultaneously to the plurality of host terminals, and can start a peer-to-peer connection as soon as a reply message is received from any of the plurality of host terminals. Thus, even when one of the host terminals is not operating, an IP address of another terminal can be acquired if the other of the host terminals are operating. Moreover, since a peer-to-peer communication is started by consulting a reply mail arriving first, there is a possibility that the time necessary for starting a connection can be made shorter than that in a structure with a single host terminal.

Figure 10:
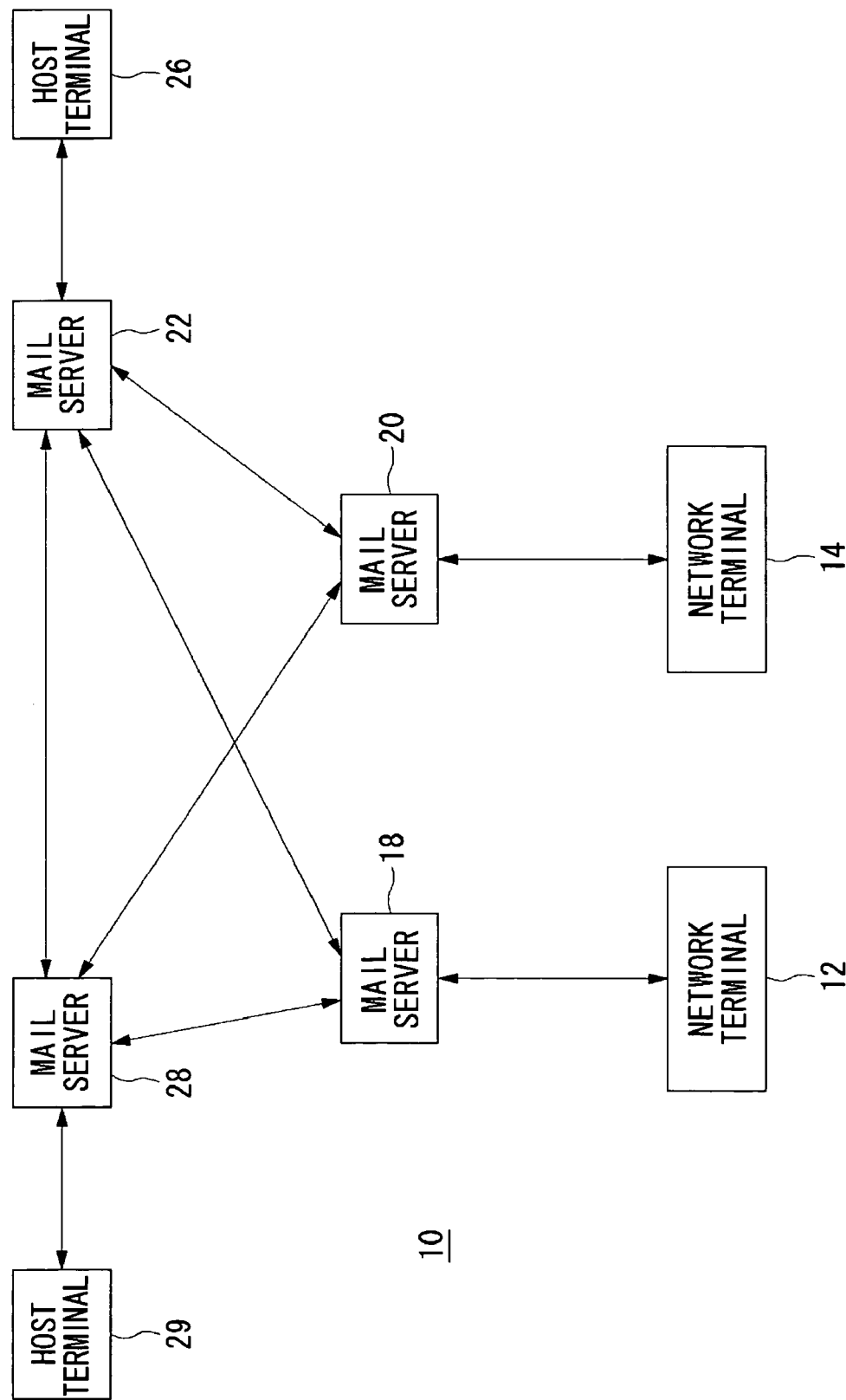
FIG. 10 shows a structure of a peer-to-peer network system according to a second embodiment of the present invention.

FIG. 10 shows a structure of a peer-to-peer network system according to the second embodiment. A peer-to-peer network system 10 includes a first network terminal 12, a second network terminal 14, a first host terminal 26, a second host terminal 29, a first mail server 18, a second mail server 20, a third mail server 22, and a fourth mail server 28.

The first host terminal 26 and the second host terminal 29 shown in FIG. 10 have the same basic structure as that of the host terminal 16 shown in FIG. 1. The third mail server 22 and the fourth mail server 28 shown in FIG. 10 have the same basic structure as that of the third mail server 22 shown in FIG. 1. The first host terminal 26 and the second host terminal 29 receive the same request message carrying both their Email addresses, so that they can obtain the Email address of each other from the contents of description. The first host terminal 26 and the second host terminal 29 also send a reply message containing IP addresses having been stored to other host terminals. In this manner, host terminals may exchange IP addresses among themselves and supplement the contents of storage in the control table, using the others. If it is desired that the plurality of host terminals have unified contents of the control tables, the contents thereof may be synchronized by exchanging the contents thereof periodically.

For example, when the first host terminal 26 is operated alone as a host terminal and then the second host terminal 29 is to be operated additionally, the second host terminal 29 sends a message requesting the contents of the control table 130 to the first host terminal 26 via the fourth mail server 28. To this message, the first host terminal 26 generates a reply mail containing the contents of the control table 130 and sends this reply mail to the second host terminal 29 via the third mail server 22. The second host terminal 29 receives a reply message from the fourth mail server 28, extracts lists of IP addresses, user IDs and the like from the reply message and stores them in its own control table. In this manner, when a host terminal is added, the contents of the control table thereof may be supplemented by those of the other host terminals.

In another embodiment, three or more host terminals are provided and one of them is assigned to be a representative host terminal that receives request messages sent from a plurality of network terminals. This representative host terminal transfers the received request messages to any of the other host terminals without changing the senders' Email addresses. In doing so, the representative host terminal distributes the transferred mail among the other host terminals so that the equal numbers thereof are delivered to them. As a result, when there are a large number of request messages, the processing load of storage, selection, encryption and the like of IP addresses can be distributed among the plurality of host terminals. Furthermore, such a distribution may be accomplished by a relatively simple processing, such as the transfer of electronic mail.

The present invention has been described based on the embodiments which are only exemplary. It is understood by those skilled in the art that there exist other various modifications to the combination of each component and process described above and that such modifications are encompassed by the scope of the present invention. Such modified examples will be described hereinbelow.

Though the network terminals and host terminals are structured by separate units of hardware in the first and second embodiments, they may be structured integrally as a single unit of hardware. In other words, an arbitrary network terminal that carries out a peer-to-peer communication may serve also as a host terminal. For example, the function of a network terminal and the function of a host terminal may be realized by their respective application programs and both the programs may be run on a single network terminal simultaneously. Or a single application program having the function of a network terminal and the function of a host terminal may be run on network terminals.

When a network terminal serves also as a host terminal, there may be various methods considered about which network terminal serves as a host terminal. For instance, all the network terminals may be provided with the function of a host terminal, and they may be strung together to form a linked network. Or, a structure may be such that a network terminal that receives a request message first automatically starts operation as a host terminal.

In the first embodiment, the data generator 30 of the first network terminal 12 encrypts the user ID, together with the IP address, as identification information. In a modification, the data generator 30 may generate a random session ID as identification information in response to a request for connection. The data generator 30 encrypts this session ID and includes it in a request message. The host terminal 16, which has received the request message, includes this session ID in a reply message and sends it back. The first network terminal 12 can recognize the authenticity of the reply message by seeing the same session ID written therein. In this manner, a "false" reply message which is under the disguise of a fake reply message may be recognized as such at its arrival and thus rejected.

Although the present invention has been described by way of exemplary embodiments, it should be understood that many changes and substitutions may further be made by those skilled in the art without departing from the scope of the present invention which is defined by the appended claims.

What is claimed is:

1. A network system, comprising:

a client terminal that requests a peer-to-peer communication; and a host terminal that supports a connection of the peer-to-peer communication, wherein said client terminal generates a request message embodied by an electronic mail message that contains in the message body at least one character indicating an IP address of said client terminal, and said client terminal sends out the request message to said host terminal via a transmission mail server, wherein said host terminal acquires the request message via a reception mail server, said host terminal extracts the IP address of said client terminal from a description content of the message body of the request message, said host terminal stores the extracted IP address in a table, said host terminal selects at least one IP address from the table and generates a reply message embodied by an electronic mail message containing in the message body at least one character indicating the selected at least one IP address, and said host terminal sends the reply message to said client terminal via the transmission mail server, and wherein said client terminal acquires the reply message via the reception mail server, said client terminal extracts at least one IP address of other terminals from a description content the message body of the reply message, and said client terminal starts a peer-to-peer communication of data transmission and reception with another terminal which is specified based on the extracted IP address.

2. A method of establishing a network connection comprising:

generating a request message embodied by an electronic mail message that contains in the message body at least one character indicating an IP address of a client terminal requesting a peer-to-peer communication;

sending the request message, via a transmission mail server, to a host terminal that supports a connection of the peer-to-peer communication;

acquiring by the host terminal the request message via a reception mail server;

extracting by the host terminal the IP address of the client terminal from a description content of the message body of the request message;

storing by the host terminal the IP address extracted by said extracting, in a table;

selecting by the host terminal at least one IP address from the table and generating a reply message embodied by an electronic mail message that contains in the message body at least one character indicating the at least one IP address selected;

sending, by the host terminal, the reply message to the client terminal, via the transmission mail server;

acquiring by the client terminal the reply message, via the reception mail server;

extracting by the client terminal at least one IP address of other terminals from a description content of the message body of the reply message; and starting a peer-to-peer communication of data transmission and reception with other terminals which are specified based on the IP address extracted by the client terminal in said extracting.

3. A method according to claim 2, wherein said generating a request message includes encrypting the IP address and including the encrypted IP address in the request message, and wherein said extracting by the host terminal includes extracting the encrypted message from the request message and decoding the extracted encrypted message.

4. A method according to claim 2, wherein said generating a reply message includes encrypting the at least one IP address and including the encrypted IP address in the reply message, and wherein said selecting by the host terminal includes selecting the encrypted at least one IP address and then decoding the selected encrypted IP address.

5. A network terminal apparatus, comprising:
- a data generator which generates a request message embodied by an electronic mail message that contains in the message body at least one character indicating an IP address of the network terminal;
- a mail transmission and reception unit which sends out the request message to a second terminal serving as a host, via a transmission mail server, and which acquires a reply message embodied by an electronic mail message and serving as a response generated by and sent from the second terminal serving as a host, via a reception mail server;
- a selection processing unit which extracts at least one IP address of other terminals from a description content of the message body of the reply message; and
- a data exchanging unit which starts a peer-to-peer communication of data transmission and reception with a third terminal which is specified based on the IP address extracted by said selection processing unit.

6. A network terminal apparatus according to claim 5, wherein said data generator encrypts the IP address and has the encrypted IP address contained in the request message, and said selection processing unit extracts the encrypted IP address from the reply message and decodes the extracted IP address.

7. A network terminal apparatus according to claim 5,
- wherein, if data transmission and reception are unsuccessful with a destination terminal whose IP address is the extracted IP address, said data generator generates a message containing said IP address, and
- wherein said mail transmission and reception unit sends, to the terminal serving as a host, said message indicative of an unsuccessful connection.

8. A network terminal apparatus, comprising:
- a mail transmission and reception unit which acquires, via a reception mail server, a request message embodied by an electronic mail message containing in the message body at least one character indicating an IP address of a second terminal that requests a peer-to-peer communication;
- an extraction processing unit which extracts the IP address from a description content of the message body of the request message;
- an address storage unit which stores the extracted IP address in a table; and
- a data generator which selects at least one IP address from a storage content of the table and generates a reply message embodied by an electronic mail message that contains in the message body at least one character indicating the selected IP address,
- wherein said mail transmission and reception unit sends out the reply message to the requesting terminal, via a transmission mail server.

9. A network terminal apparatus according to claim 8,
- wherein said extraction processing unit extracts an encrypted IP address from a description content of the request message and decodes the encrypted IP address, and
- wherein said data generator encrypts the at least one IP address and has the encrypted IP address included in the reply message.

10. A network terminal apparatus according to claim 8, wherein said address storage unit restricts the number of IP addresses to be stored in the table, and overwrites IP addresses previously stored.

11. A network terminal apparatus according to claim 8, wherein said data generator selects from the storage content of the table a previously stored IP address.

12. A network terminal apparatus according to claim 8,
- wherein said mail transmission and reception unit acquires a message containing an IP address of a destination terminal with which the requesting terminal fails to start the data transmission and reception, via the reception mail server, and said extraction processing unit extracts the failure IP address from a description content of the message, and
- wherein said address storage unit distinguishes the failure IP address from other IP addresses.

13. A method of establishing a network connection, the method comprising:
- generating a request message embodied by an electronic mail message containing in the message body at least one character indicating an IP address of a first terminal that requests a peer-to-peer communication;
- sending the request message to a second terminal serving as a host, via a transmission mail server;
- acquiring a reply message serving as a response embodied by an electronic mail message generated by and sent from the second terminal serving as a host, via a reception mail server;
- extracting at least one IP address from a description content of the message body of the reply message; and
- starting a peer-to-peer communication of data transmission and reception with at least one other terminal which is specified based on the IP address extracted by said extracting.

14. A method of establishing a network connection, the method comprising:
- acquiring, via a reception mail server, a request message embodied by an electronic mail message containing in the message body at least one character indicating an IP address of a terminal that requests a peer-to-peer communication;
- extracting the IP address from a description content of the message body of the request message;
- storing the extracted IP address in a table;
- selecting at least one IP address from a storage content of the table and generating a reply message embodied by an electronic mail message that contains in the message body at least one character indicating the selected IP address; and
- sending the reply message to the requesting terminal, via a transmission mail server.

15. A computer-readable recording medium which stores a program executable by a computer, the program comprising the functions of:
- generating a request message embodied by an electronic mail message containing in the message body at least one character indicating an IP address of a first terminal that requests a peer-to-peer communication;
- sending the request message to a second terminal serving as a host, via a transmission mail server;
- acquiring a reply message embodied by an electronic mail message and serving as a response generated by and sent from the second terminal serving as a host, via a reception mail server;
- extracting at least one IP address of other terminals from a description content of the message body of the reply message; and starting a peer-to-peer communication of data transmission and reception with at least one other terminal which is specified based on the IP address extracted by the extracting.

16. A computer-readable recording medium which stores a program executable by a computer, the program comprising the functions of:

acquiring, via a reception mail server, a request message embodied by an electronic mail message containing in the message body at least one character indicating an IP address of a terminal that requests a peer-to-peer communication;

extracting the IP address from a description content of the message body of the request message;

storing the extracted IP address in a table;

selecting at least one IP address from a storage content of the table and generating a reply message embodied by an electronic mail message that contains in the message body at least one character indicating the selected IP address; and sending out the reply message to the requesting terminal, via a transmission mail server.

* * * * *